United States Patent [19]

Stringer

[11] Patent Number: 5,642,417
[45] Date of Patent: Jun. 24, 1997

[54] VIRTUALIZED INSTALLATION OF MATERIAL

[75] Inventor: John W. Stringer, Santa Cruz, Calif.

[73] Assignee: Testdrive Corporation, Santa Clara, Calif.

[21] Appl. No.: 344,863

[22] Filed: Nov. 25, 1994

[51] Int. Cl.$^6$ ..................................................... H04L 9/00
[52] U.S. Cl. .................... 380/4; 380/49; 380/50
[58] Field of Search ................... 380/4, 49, 50, 380/59; 395/154, 615, 806, 807

[56] References Cited

U.S. PATENT DOCUMENTS

| | | | |
|---|---|---|---|
| 5,241,671 | 8/1993 | Reed et al. | 395/154 X |
| 5,305,389 | 4/1994 | Palmer | 382/1 |
| 5,341,429 | 8/1994 | Stringer | 380/23 |

OTHER PUBLICATIONS

St. John, Alex and Camp, Jeff, "Building AutoPlay–Enabled CD–ROM Titles and Games", Version 1.0, Microsoft Windows Multimedia Systems Autoplay, 1 Nov. 1994.

MicroHelp Utilities for Windows, Uninstaller 2 Technical Specifications, MicroHelp, Inc., Marietta, GA, Nov. 1993.

CD Essentials, Multimedia PC Technical Specifications, Phoenix Technologies, Ltd., 1994

MKS RCS Technical Specifications, Mortice Kern Systems, Inc., Waterloo, Ontario, Canada, No Date.

*Primary Examiner*—Bernarr E. Gregory
*Attorney, Agent, or Firm*—Michael A. Glenn

[57] ABSTRACT

Virtualization converts a normally unidirectional process into a bi-directional process to permit automatic install and uninstall of new material, addition and/or modification of target materials while preserving the state of target material, and conversion of materials having a specific media characteristic into an extended range of media characteristics. Applications include temporary retooling of assembly line for short production runs, associating the installation of materials with the mounting of removable media and the uninstalling materials with the unmounting of removable media, and repurposing stand-alone applications for client-server environments without requiring modifications to the design of the stand-alone application.

21 Claims, 4 Drawing Sheets

VIRTUALIZED INSTALLATION OF MATERIAL

BACKGROUND OF THE INVENTION

1. Technical Field

The invention relates to ephemeral and physical material. More particularly, the invention relates to installation of computer software, automatic operation of computer software, and the retooling of real time processes, e.g. for assembly lines.

2. Description of the Prior Art

Removable media, such as CD-ROMs, are widely used to distribute various materials, including entertainment and application software, image and font catalogues, and multimedia programming. Delivery of the material contained on such media requires user installation of the material onto a system level storage medium, such as a hard disk. CD-ROMs are not able to modify their contents, for example to set user preferences, without altering a host system, nor are they are able remove materials from a system after use. Thus, CD-ROM drives are a form of peripheral device, i.e. they are not fully integrated into the operation of the system because they are read-only devices.

J. Stringer, T. Richards, *Transformation of Ephemeral Materials*, U.S. Pat. No. 5,341,429 (23 Aug. 1994) discloses a system that is used to repurpose material for off-line trial use, and to enable such material if subsequently authorized. In such system, interaction with the author/owner of the original material is not required. One limitation of this system is that it does not protect a user's computer configuration from modification when auditioning trial versions of ephemeral material. Such system also does not allow automatic uninstall of the materials, such that the system is allowed to revert back to a previous configuration.

A commercially available software product, MicroHelp Uninstaller (MicroHelp, Inc., 4359 Shallowford Industrial Parkway, Marietta, Ga. 30066), is useful to build a database about various applications, such that removal of an application from a system is simplified. However, such product does not virtualize between media to improve cost or performance, i.e. it does not create a virtual write-read device, for example by mapping a CD-ROM to a hard drive; nor does it support bi-directional installation, where shared resources revert back to a previous version, e.g. where a system is automatically returned to a previous configuration after the materials are no longer in use.

Another commercially available software product is Phoenix CD Essentials (Phoenix technologies Ltd., 846 University Ave., Norwood, Mass. 02062), which is useful to detect the presence of a previously installed CD-ROM, and thereafter automatically launch an application contained on said CD-ROM. However, the product does not virtualize between media to improve performance or cost, nor does the product support bi-directional installation, where shared resources revert back to a previous version when they are no longer in use.

Microsoft Windows 95 AutoPlay (Microsoft Corporation, Redmond, Wash.) provides a product feature that can detect the presence of a compliant CD-ROM and automatically launch an application contained on such CD-ROM. However, the product may need to change the application installation to comply with an AutoPlay enable format. Additionally, the product does not virtualize across media to improve performance, nor does the product automatically support bi-directional install, where shared resources revert back to a previous version when they are no longer in use.

Predictive caching is a known technique that can analyze the use of an application to determine a virtualization strategy. See, for example M. Palmer, *Predictive Cache System*, U.S. Pat. No. 5,305,389 (19 Apr. 1994), which discloses a system in which prefetches to a cache memory subsystem are made from predictions that are based on access patterns stored by context. Such access patterns are generated during a training sequence. However, predictive caching does not redirect complex references to an application to new location (e.g. from a CD-ROM to a hard disk), nor does it support bi-directional install, where shared resources revert back to a previous version when they are no longer in use.

Configuration management systems are also known, e.g. MKS RCS (Mortice Kern Systems, Inc., 35 King St. North, Waterloo, ONT N2J 2W9). Such systems identify differences between text files, allow bi-directional modifications to the files, and allow reversion back to a previous version. However, the scope of such systems is limited to special purpose text files. Accordingly, such systems do not work on a finished binary version of an application.

SUMMARY OF THE INVENTION

The invention provides a system in which a unique virtualization technique converts a normally unidirectional process into a bi-directional process to permit automatic install and uninstall of new material, addition and/or modification of target materials while preserving the state of target material, and conversion of materials having a specific media characteristic into an extended range of media characteristics. Applications of the invention include the temporary retooling of an assembly line for short production runs, associating the installation of materials with the mounting of removable media and uninstalling of materials with the unmounting of removable media, and repurposing stand-alone applications for client-server environments without requiring modifications to the design of the stand-alone application.

DETAILED DESCRIPTION OF THE INVENTION

Figure 1:
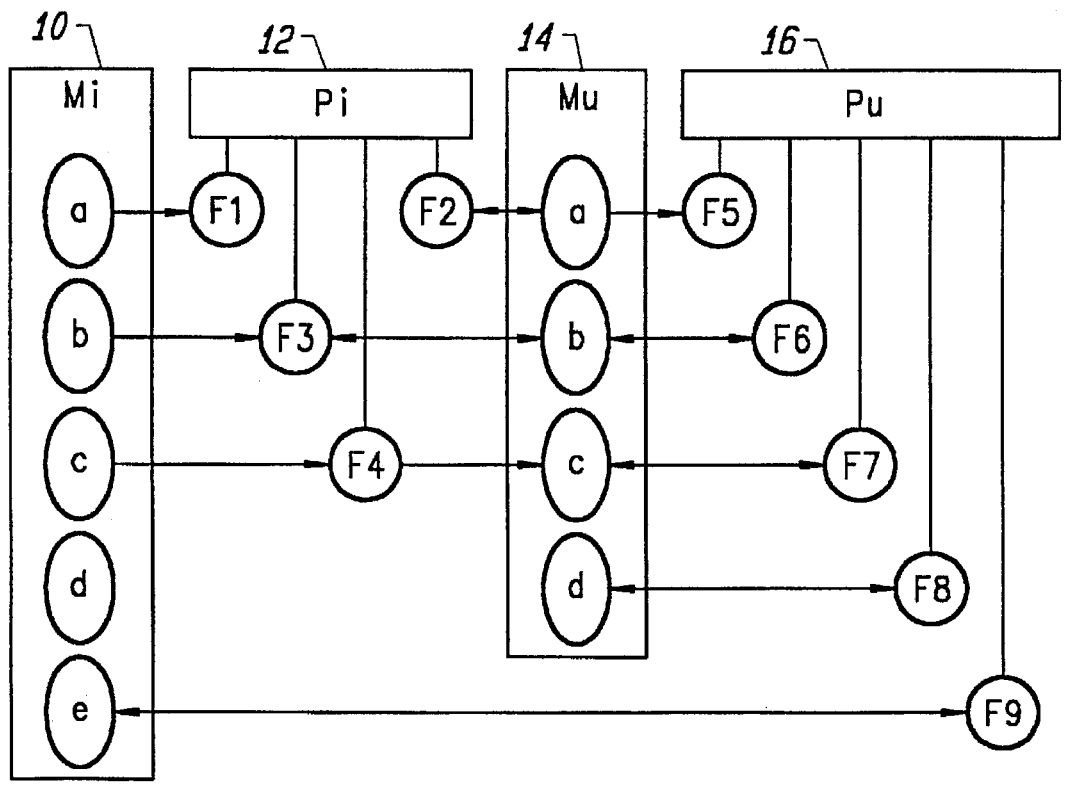
FIG. 1 is a block diagram of prior art installation and user environments.

The invention provides a method and apparatus that converts a normally unidirectional process into a bi-directional process to permit automatic install and uninstall of new material onto a system. The invention allows adding and modifying of target materials, while preserving the state of target material. Materials having a specific media characteristic are converted into an extended range of media characteristics. Applications of the invention include temporary retooling of an assembly line for short production runs; associating installation of ephemeral materials, such as computer software, with the mounting of removable media and uninstalling of such materials with the unmounting of removable media; and repurposing stand-alone applications for client-server environments without requiring modifications to the design of the stand-alone application.

Definition of Terms

The following terms are consistently applied herein with the following associated meanings:

Ephemeral Media: Ephemeral media include CD-ROMs, hard disk drives, read-only and random-access solid-state memory, digital audio tape ("DAT"), audio tape, VHS and Beta videotape, radio, television, the Internet and other data and communications networks, satellite, broadcast, and point-to-point communications. Some of the characteristics that are common to all ephemeral media include: the media produce, store, or operate in connection with an electrical charge; they are readable and writeable; they provide a density of information over space; and they provide specific storage formats.

Physical Media: Physical media include paper based media, such as books, newspapers, magazines; and production line based media, such as robot arms, conveyor belts, and storage bins. Some of the characteristics that are common to all physical media include: they have all the characteristics of ephemeral media, described above; the may have a range of angular motion, they may result in displacement of three-dimensional space, and they have operational specifications.

Material: Material provides a repository of resources. Each resource may reside on the same media or on a different media. Additionally, each resource may affect the characteristics of other resources. Examples of material include personal computers, software installation disks, and a set of toy building blocks (physical media).

Process: A process describes the interaction of resources and media. A kinetic process refers to a state of current behavior; a potential process refers to a state of behavior in the future when a set of conditions are satisfied. A task is defined as a sub-process.

Environment: An environment is a collection of materials, processes, media, and related human interaction. State information determines how resources and processes behave and interact. Specific instances referred to as a configuration, include materials, processes, media, human identity, and state information. Examples of an environment include an end user's computer, an application installation program, and an assembly line.

User Environment: A user environment is the target of an installation process. New materials and processes are added to a user environment, old materials and processes are modified in a user environment, and old materials and processes are removed from a user environment. User environment configuration information may be polled to determine human identity and whether or not specific materials, processes, and media exist within the user environment. A user is not an end user because an end user refers to person interacting with a user environment.

Application: An application is a subset of a user environment. Thus, an application is a specific instance of user tasks and resources that is used to carry out a specific set of end user goals.

Virtualization: Virtualization refers to a change in mapping of process state information relating to media and resources, for example a CD-ROM mapped as read-write device. Virtualization also refers to media operational characteristics, e.g. mapping a read-only function to a read-writeable function; and resource distribution to media, e.g. mapping from a CD-ROM to a hard drive disk. An example of virtualization is the mapping of a four motion robot arm to five motion robot arm. Virtualization is applicable to standard processes and materials, i.e. it may be applied to advantage to all instances of prior art installation.

Installation Environment: The installation environment is a source for modifying the user environment. The installation environment is used to obtain user configuration information and compare the user configuration with the installation environment configuration information.

Redirection Environment: The redirection environment is a modified user environment that is added to companion processes. The redirection environment allows virtualization of resources to alternative media, as well as change of process state information.

Delta Configuration: The delta configuration shows differences between the user environment before and after an installation process. The delta configuration is used for virtualization, to monitor material resources and processes, for delta resource names and process states, and to identify candidates for remapping.

Test Environment: The test environment is used to collect the user environment configuration, to create a delta configuration, to copy a generic user environment, to invoke an installation process, to compare "before" and "after" versions, and to build a delta configuration from determined differences.

Description of Drawings: Naming Conventions

The following naming conventions and symbols are used consistently in the discussion herein and in the figures:

1. Symbols beginning with the letter:
   "M" denote a material;
   "P" denote a process;
   "F","R","r" denote a sub-process or task; and
   "a","b","c","d","e" denote example resources.

2. Symbols having as a second letter:
   "i" denote an install environment;
   "u" denote a user environment;
   "r" denote a redirection environment; and
   "x" denote an auxiliary environment.

3. Drawing shapes have the following meanings:
   a. Boxes indicate a collection of resources or tasks;
   b. Ovals indicate resources or materials;
   c. Circles indicate tasks or processes;
   d. Thin lines without arrowheads indicate process ownership of tasks; and
   e. Thick lines with arrowheads indicate the potential flow of a resource between materials as mediated by a task.

Discussion

FIG. 1 is a block diagram of prior art installation and user environments. In the figure, a set of installation environment materials Mi (10) is shown having various resources, including resources Mi.a that contain an installation environment configuration; resources Mi.b that are used to modify the user environment; resources Mi.c that are copied to the user environment; resources Mi.d that are not used for user configuration; and resources Mi.e that are used to verify the existence of original installation media.

The installation process Pi (12) shown in FIG. 1 has several associated tasks, including a task F1 that is used to determine a source assignment for the resources Mi.b, Mi.c, Mi.d, Mi.e; a task F2 that is used to determine the destination resource assignment of the material user environment Mu (14) for the resources Mu.b, Mu.c, Mu.d, and that is used to modify destination configuration information contained in the resource Mu.a; a task F3 for user installation resources Mi.b and user resources Mu.b that is used to modify user resources Mu.b; and a task F4 that is used to copy installation resources Mi.c to a user environment Mu.c.

The material user environment Mu (14) includes user material having various resources, including resources Mu.a that contain a user environment configuration; resources Mu.b that are modified by the installation process Pi (12); new resources Mu.c that added by the installation process Pi; and resources Mu.d that are not affected by the installation process Pi, but that are needed in the operation of the application.

The installed application process for the user environment Pu (16) includes a user process having a task F5 that reads a user environment configuration Mu.a which is used to determine resource assignments for various resources Mu.b, Mu.c, Mu.d, and Mi.e; a task F6 that uses information modified by the installation process Pi to operate the application; a task F7 that uses information added by the installation process Pi to operate the application; a task F8 that uses information not affected by the installation process to operate the application; and a task F9 that optionally uses installation resources Mi.e to verify that a valid installation exists.

Installation Environment. Installation (Pi, Mi) involves the intersection of user configuration information from the user environment configuration Mu.a and installation configuration information from the install environment resource Mi.a to determine what user resources are to be modified (i.e. Mu.b by Mi.b) and what new resources are to be copied (i.e. Mi.c to Mu.c).

Installed User Environment. The user environment (Pu, Mu) uses information about the current environment configuration Mu.a, as well as various other resources Mu.b, Mu.c, Mu.d, to run an application. Optionally, extra information about the installation material Mu.e may be used to verify that the application was installed correctly.

Figure 2:
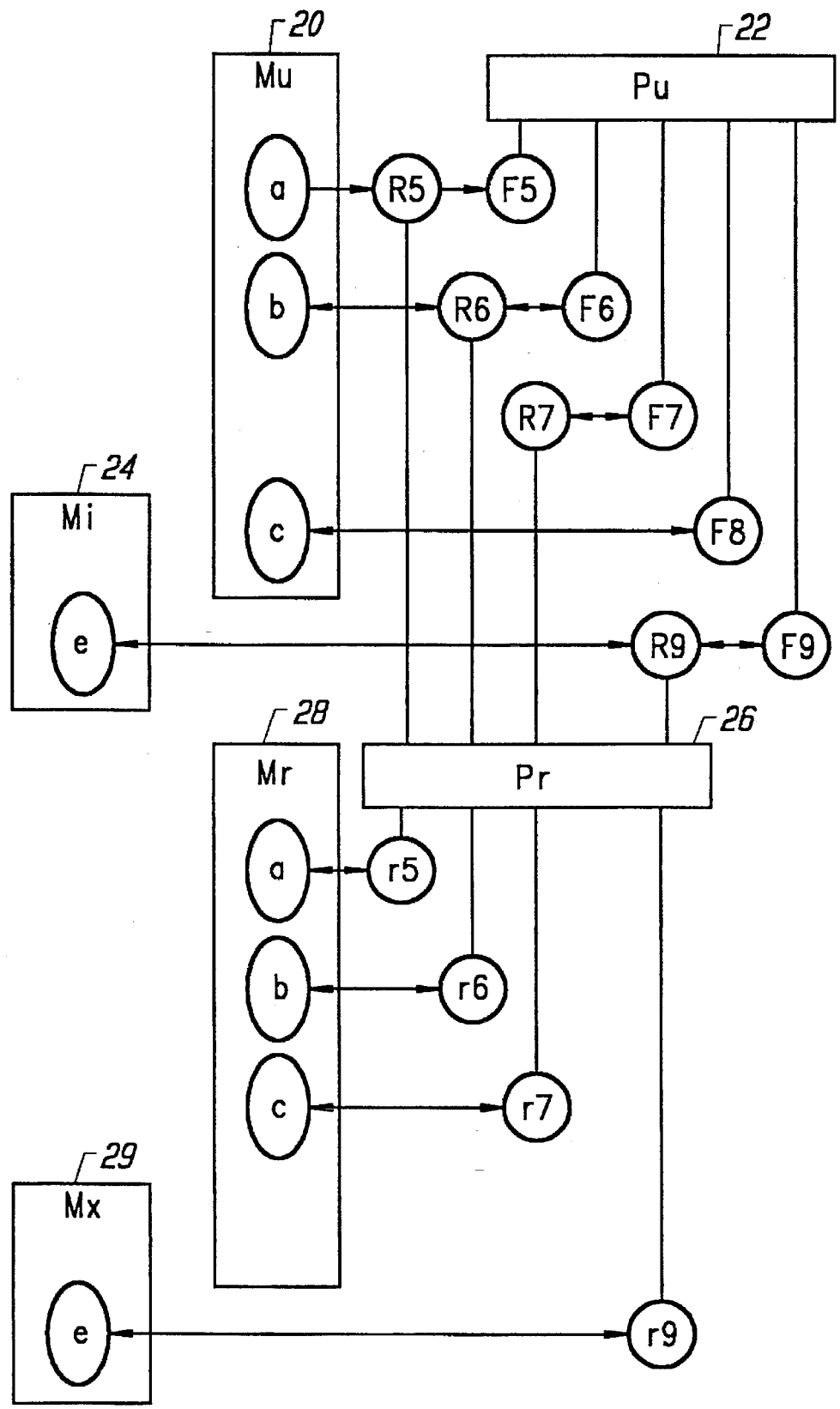
FIG. 2 is a block diagram of a user environment after installation of a virtualized application according to the invention.

FIG. 2 is a block diagram of user environment after installation of a virtualized application according to the invention. The figure shows a set of user materials Mu (20), including material that is unaffected by an install, such as an original user configuration Mu.a, and original user resources Mu.b that are normally modified by an installation. Note the absence of the installation resource Mu.c. This is because no installation resources are copied to the user material. The resource Mu.d remains unchanged. The installed application process Pu (22) provides a user process for running an application task that remains the same, as described above in FIG. 1.

A redirection process Pr (26) includes a task R5 that monitors user requests for configuration information Pu. F5. Any requests for information unaffected by a standard installation are passed onto the user resource Mu.a, otherwise the request is redirected via a task r5 to a redirection module Mr (28) that includes the redirection resource Mr.a. The task R6 monitors user requests for resources that may be changed by the standard installation. Any requests for information that are unaffected by a standard installation are passed onto the user resource Mu.b. Otherwise, the request is redirected via a task r6 to a redirection resource Mr.b. The task R7 intercepts all user requests for resources that are normally added by a standard installation, and redirects the requests via a task r7 to a redirection resource Mr.c. Note that the user task F8 is not monitored because it requests resources that are not changed by a standard installation.

The task R9 monitors user references to the original installation resource Mi.e (24). If the requested resource is available, then the request is passed through. Otherwise, the request is redirected via a task r9 to an auxiliary resource Mx.e (29).

In the figure, the redirection material Mr (28) has the following resources:

a. delta resources Mr.a that are used to convert the before-installation version of the material Mu.a to its after-installation version; and b. delta resources Mr.b that are used to convert the before-installation version of the material Mu.b to its after-installation version.

The redirection material Mr.c contains all of the resources that the standard installation process normally adds to the user material, and therefore corresponds to the install resource Mi.c.

Residual installation material Mi (24) determines where the user environment material Mi.e is used and to thereby verify the correctness of an installation or the identity of the operator. The auxiliary material Mx (29) is used to emulate residual installation material. The auxiliary material Mx.e is used to verify correctness of the installation or the identity of the operator.

When operated in accordance with the invention, the user process behaves in a normal fashion. Resource requests are monitored by the redirection process, and the redirection process classifies these resource requests. Resources that are unchanged by a standard installation are passed through, while resources that are changed by a standard installation are redirected to the redirection materials.

Figure 3:
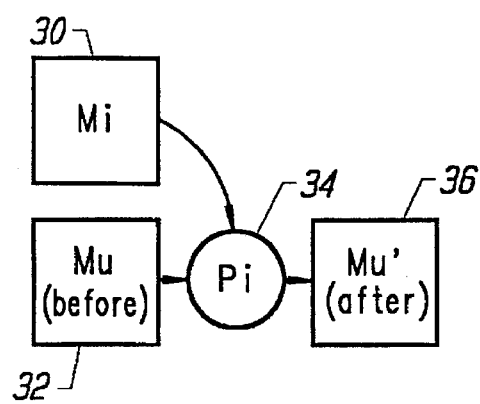
FIG. 3 is a block diagram showing that a prior art installation modifies user material.

FIG. 3 is a block diagram showing a prior art installation that modifies user material. In the figure, the install environment material Mi is shown operating upon user material. The user environment Mu shows user materials before Installation. The installation process Pi operates upon the user materials in accordance with the install materials to produce the user materials Mu' as altered after installation. Thus, the Installation process mixes its material Mi and original user material Mu to produce the revised user material Mu'.

Figure 4:
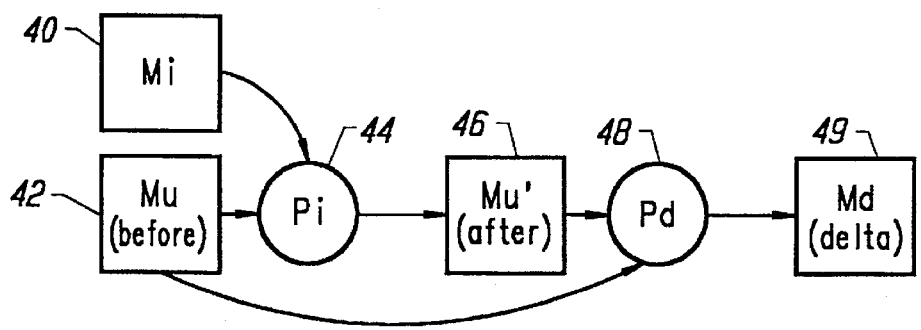
FIG. 4 is a block diagram showing that comparing the original user material with the modified user material produces a delta material in accordance with the invention.

FIG. 4 is a block diagram that shows a comparison of the original user material with the modified user material to produce delta materials. In the figure, the various materials and processes Mi (40), Mu (42), Mu' (46), Pi (44) are substantially the same as those similarly identified materials and processes shown in FIG. 3. Additionally, the process Pd (48) is a process that is used to create deltas; and the material Md (49) is the resulting delta material.

When the system is operated in accordance with the invention, the original state of the user material is preserved such that the original version Mu can be compared to the revised version Mu' after a standard install to produce, via the process Pd, a delta material Md that only contains the differences between the two materials.

Figure 5:
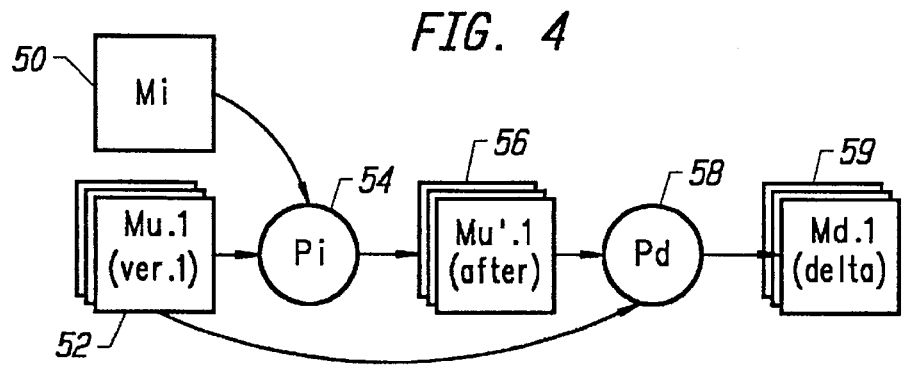
FIG. 5 is a block diagram showing multiple target testing configurations in creating deltas to support virtualized installation on a wider range of user configurations according to the invention.

FIG. 5 is a block diagram showing multiple target testing configurations for creating deltas to support virtualized installation of materials on a wide range of user configurations. In the figure, the various materials and processes Mi (50), Pi (54), Pd (58) are substantially the same as those similarly identified materials and processes shown in FIG. 4. Additionally, the user environment materials Mu.1 (52) provide one of several different versions of before-installation user material; the user environment materials Mu'.1 (56) show revised user material that corresponds to the user environment material Mu.1 after-installation; and the material Md.1 (59) shows the corresponding delta material that is created for the user environment materials Mu.1 and Mu'.1.

Differences in user material Mu may produce a different resulting post install user environment Mu'. Accordingly, different versions of the original user environments Mu.1, Mu.2, ... Mu.n are used to produce different versions of the revised user environments Mu'.1, Mu'.2, ... Mu'.n.

Figure 6:
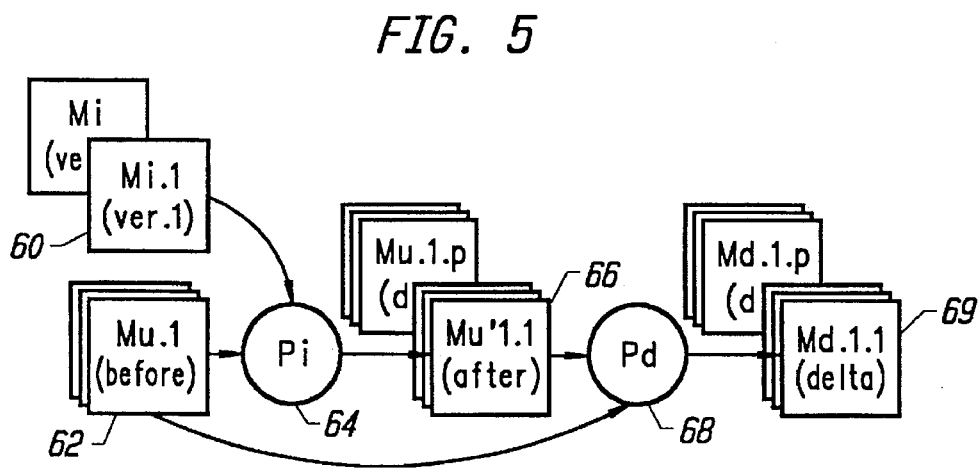
FIG. 6 is a block diagram showing the testing of multiple versions of source install material to support version updates of virtualized installations in accordance with the invention.

FIG. 6 is a block diagram showing the testing of multiple versions of source install material to support version updates of virtualized installations. In the figure, the processes and materials Pi (64), Pd (68), Mu.1 (62) are substantially the same as those similarly identified processes and materials shown in FIG. 5. The install environment materials Mi.1 (60) provide one of several different versions of installation materials, while the materials Md.1.1 (69) show the delta material corresponding to the install environment materials Mi.1 that is created by comparing the user environment materials before-installation Mu.1 and the user environment materials after-installation Mu'. 1.1 (66).

In the embodiment shown in FIG. 6, both sets of user material versions Mu.1- Mu.n and installation material versions Mi.1-Mi.p are used to produce delta materials Md.1.1-Md.n.p to virtualize material updates to an already installed system.

Figure 7:
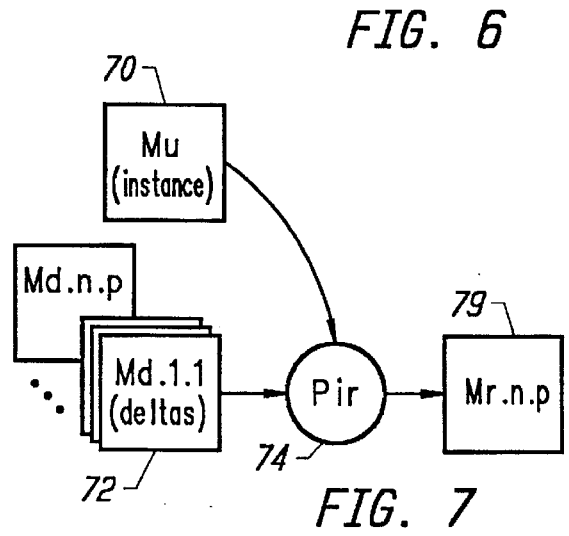
FIG. 7 is a block diagram showing a process for redirecting multiple versions of delta material with one instance of user environment material to produce redirected process material in accordance with the invention.

FIG. 7 is a block diagram showing a process for redirecting multiple versions of delta material with one instance of user environment material to produce redirected process material in accordance with the invention. In the figure, the delta materials Md.1.1-Md.n.p (72) refer to iterations of all the versions of the delta materials Md. The user environment materials Mu (70) provide a specific one of several different instances of user environment materials. The install redirection process Pir (74) applies the delta materials produced as described above in connection with FIGS. 4–6 to the specific instance Mu to produce the redirection process material Mr.n.p (79). In this way, virtualized material may be adapted for use with any system.

EXAMPLE 1

Virtualized Software Installation

Standard Installation (Prior Art)

A standard installation consists of the following steps:

1. Obtain user configuration information, such as files on system shared resources, e.g. dynamic linked libraries ("DLLs") and fonts. This determines which install resources to ignore. Also obtain as necessary and available version numbers, operating system (e.g. DOS), GUI environment (e.g. Windows), system serial number, hardware serial number, operating system serial number, system serial number, hidden information, and user personal identity, e.g. user name, password, social security number, and bank account.

2. Modify user resources, such as system state information that is used by the operating system, and/or the GUI system. For example, Windows Version 3.1 vs. MS-DOS 6.2: change WIN.INI and SYSTEM.INI files; change AUTOEXEC.BAT and CONFIG.SYS files.

3. Add new user resources, such as unique resources, data files, executables, and resources shared by several applications, e.g. DLL, fonts, VBXs, and OBXs.

4. Setup proprietary information using such known techniques as diskette copy protection methods and hardware dongles. This step is considered a part of the install material even though resources required to carry out this step may already reside on media provided by customer, such as on the hard disk. Example: hide product counters on undocumented part of hard disk.

Virtualized Installation

1. Obtain user configuration information. The user configuration does not affect the installation assignment of resources. This step applies the same task as a standard installation, and uses the configuration information to select the correct version of delta material. This step may be ignored for some applications.

2. User resources are unmodified. Resources modified by a standard install are saved on separate material. Resources added by a standard install are also saved on separate material. A redirector is installed to cause the system to operate as though a standard install has occurred.

3. Proprietary information is redirected. Some applications may not require this step. One example of redirection of proprietary information involves diskette copy protection, where the system provides requested information even if a diskette is not present.

Virtualized Uninstall

1. Remove redirection material and processes. For example, delete a disk directory containing various files.

EXAMPLE 2

Insert/Eject Install/Uninstall CD-ROM (Auto-Launch)

Standard Install (Prior Art)

1. Normally add or modify resources to user material.

Virtual Install and Uninstall

1. Material is automatically installed upon insertion. The prior art provides a system that automatically invokes a process upon media insertion, e.g. Microsoft AutoPlay for Compliant Applications (discussed above), Phoenix CD essentials after first install (also discussed above), and various monitors. However, there are various limitations in prior art systems. For example, such systems can adversely affect the behavior of other applications, new versions of shared resources, and new resources that occupy space on the media after uninstall. In contrast, virtual install allows multiple versions of shared resources, and are context sensitive to the application that is requesting a resource.

2. Automatically uninstall after eject, i.e. remove the virtual version of the shared resources when the material is no longer needed.

3. Subsequent insertions quickly display a startup bit map that shows what an application looked like before ejecting the material. The bit map serves as a place holder that provided information regarding the state of such items as window position, application bit maps, and cursor position. In operation, the systems loads a previously used data file, for example a last loaded spreadsheet. A static startup bit map is then replaced with the dynamic application, and the process repeats.

Figure 8:
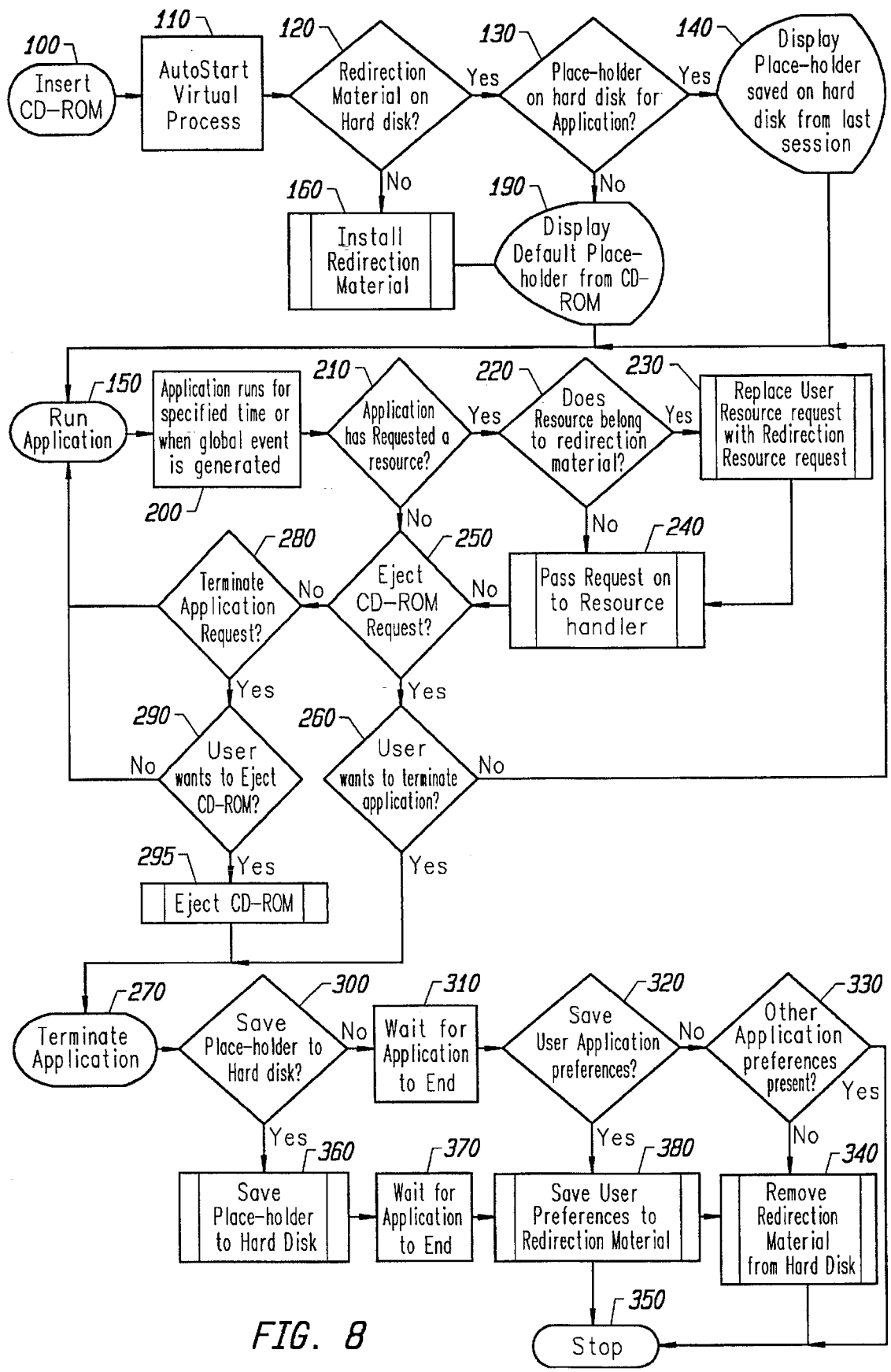
FIG. 8 is a flow diagram of a virtual autostart, install, and uninstall system for a CD-ROM in accordance with the invention.

FIG. 8 is a flow diagram of a virtual auto-start, install, and uninstall system for a CD-ROM in accordance with the invention. In the figure, the system accepts the material which, in the Example, is a CD-ROM (100). The system then commences an auto-start virtual process (110). The process looks for redirection material on the system hard disk (120), and if such material is found, the process then looks for an application specific place holder on the hard disk (130). If the place holder is found, the process displays the place holder saved on the hard disk from the last session (140) and then runs the application (150). If the place holder is not found (130), the process displays a default place holder for the application from the CD-ROM (190) and then runs the application (150). If no redirection material is found on the hard disk (120), the process install the redirection material as appropriate (160) and displays the place holder for the application from the CD-ROM (190). The process then runs the application (150).

The application runs for a specified time or until a global event is generated (200), at which time a check is made to determine if the application has requested a resource (210). If a resource is requested, the process determines if the resource belongs to the redirection material (220) and, if so, the process replaces the user resource request with the redirection resource request (230) and passes the request onto the resource handler (240). If the resource requested does not belong to the redirection material (220), the process passes the request onto the resource handler (240).

If the application has not requested a resource (210), or if a request is passed on by the resource handler (240), the process determines if a request to eject the CD-ROM has been issued (250). If so, the process determines if the user wants to terminate the application (260) and, if so, the application is terminated (270). Otherwise, the process continues to run the application (150).

If a request has not been issued to eject the CD-ROM (250), then the process determines if a request has been issued to terminate the application (280). If so, the process determines if the user wants to eject the CD-ROM (290) and, if so, the CD-ROM is ejected (295) and the application enters the termination phase (270). Otherwise, the applications continues to run (150).

If the application enters the termination phase (270), then a determination is made if a place-holder should be saved on the hard disk (300). If so, the place-holder is saved to the hard disk (360) and the process waits for the application to end (370), at which point the process saves the user preferences to redirection material on the hard disk (380) if appropriate and the process is then stopped (350). Otherwise, the redirection material is removed from the hard disk (340) and the process is stopped (350).

If a place holder is not to be saved to the hard disk (300), then the process waits for the application to end (310). When the application ends, the process determines if user application preferences are to be saved (320). If so, the user preferences are saved to redirection material on the hard disk (380) and the process stops (350). Otherwise, the process checks to see if other applications preferences are saved to redirection material (330) and, if so the process is stopped (350). Otherwise, the redirection material is removed from the hard disk (340) and the process is then stopped (350).

EXAMPLE 3

Three-Dimensional Virtual On-line Service

1. Insert the material, e.g. a CD-ROM and a startup bit map is displayed, i.e. a place holder that is left behind on the hard drive from a previous session, that shows the last position in the three-dimensional virtual world. At this point, the cursor is not yet active.

The application is then installed and begins running. At this point, the cursor becomes active, and the user can navigate amongst various rooms in three-dimensional virtual space. An on-line connection is made, which is equivalent to loading a data file for other applications. The end user is automatically identified, and avatars (i.e. animated bit maps representing other people in the three-dimensional space) appear, showing the proximity of the other individuals.

2. Normal Operation ensues, which may include dialogs with other individuals and other transactions. In this mode, all other applications on the system run normally.

3. Eject the CD-ROM. End user verification of uninstall is obtained, and on-line conversations and transactions are automatically concluded. State information about the end user's location within three-dimensional space and other end user preferences are saved to the hard disk in a special directory. All other resources related to the three-dimensional virtual space are removed from the end user's system.

EXAMPLE 4

Software License Management

This Example applies to a single user software application in which there is no awareness of an end user network.

1. Repackage the software application for network uses. There is no need for a separate recompiled version of the application. Thus, the invention allows a software vendor to repackage a single user binary application and eliminate the software vendor quality assurance cycle. In this example, the system redirects material resources, which are then distributed to a client server. License enforcement involves toggle activation of the redirector after compliance with the license agreement is verified.

2. Automatic license upgrade is provided as follows: determine whether maximum number of simultaneous users or specific identity of individual users, determine the cost of the upgrade to support the network load, perform an automatic financial transaction to upgrade the license. Additional support may be provided within seconds of determining the need.

EXAMPLE 5 virtualized Robot Retooling

Mapping

In this Example, the material is a physical material that can include for example an assembly, subassembly, part, robot, conveyor, bin containers, and jigs. The process of interest controls, for example, a range of motion for a robot or a conveyor, or a range of modifications to part (e.g. drill, rotate, or move). The media may be thought of as such things bin locations, conveyor position, or shipping and receiving methods. The process may be thought of as moving a part between various locations, or as modifying a part's shape.

Standard Install (Prior Art)

1. Replace the hardware, e.g. the robot arms and conveyor belts.
2. Replace the software, e.g. the robot control software and application specific instructions.
3. Reconfigure the bins and the assembly line.

Virtualization Process

1. Model the user environment, including the current materials, media, and processes.
2. Model the installed user environment. For example, replace or retool the robots and jigs, move the conveyors and bins, or revise the shipping and receiving methods.
3. Generalize the configuration, e.g. the range of motion for robot actuator arms, range of speed of conveyor belts, or range of parts inventory delivery lead times.
4. Create a delta configuration description, i.e. a new range of motions created by installation and modified by the routing of parts created by the install.

Virtualized Installation

1. Install delta material in a separate facility, e.g. an unoccupied portion of the shop floor, out source a portion of the process to a third party, install a new conveyor belt and/or robot to route a part to a new facility, or to shipping for the out-sourced producer.

2. Install the redirection process in the current facility. Automatically identify parts covered by the old or redirected production line. Let the old production line part pass though with no change in routing. Pluck the new production line part and forward it to the new facility.

Virtualized Uninstall

1. Remove a temporary conveyor and/or robot used for redirection. The factory is reverted back to the original production line.

Rules

1. Redirection of parts. The system cannot produce an error condition that affects normal operation of the production line, and cannot commandeer resources normally used in the original production line. Thus, the redirection instructions must not change the configuration of the original instruction. Redirection must not expand the scope of the quality assurance cycle of the original production line.

2. Virtualized uninstall. Removing the redirection equipment reverts the production line back to its original configuration. No modifications to the original environment are needed.

Although the invention is described herein with reference to the preferred embodiment, one skilled in the art will readily appreciate that other applications may be substituted for those set forth herein without departing from the spirit and scope of the present invention.

For example, the invention may be used to convert a uni-directional process to a bi-directional process, where no information is destroyed during an installation. The invention may also be used to:

a. facilitate complete uninstallation of material, such that the material reverts back to exact image of the user environment prior to installation after uninstall is complete; and b. leave behind resources about redirected process.

In these embodiments of the invention, state information and usage are used to:

a. accelerate subsequent installations;

b. preserve end user application preferences;

c. hide information on user owned media;

d. enforce license agreements with or without user approval;

e. save counter information for trial products;

f. hide the complexity of virtual installation; and g: to allow:

i) simplified user configuration information;

ii) protect end user application preferences; and iii) facilitate remapping of material resources to other media.

In some applications of the invention, new media may have different characteristics than the source media. For example, read-only media (e.g. CD-ROM) vs. read-write media (e.g. hard disks).

Virtualization in accordance with the invention may be used to improve bandwidth, seek times, and memory persistence during power outages. The invention is also useful in adapting material for use between asynchronous and bisynchronous environments. Examples include:

a. running software applications intended for a fast read-write hard disk from a slow read-only CD-ROM;

b. converting single user applications to a client-server environment;

c. polling for the existence of a hardware dongle which is redirected to information hidden on a hard disk.

The delta configuration aspect of the invention is readily applied to bracket user environments with multiple tests where comparing resulting deltas determines a range of different configurations; and to bracket version upgrades with multiple tests where comparing resulting deltas allows a virtualized upgrade to be used for different configurations. Thus, the invention allows simplified configurations of install or user resources because the install material uses read-only media during the install process and does not add new resources to the user material. Accordingly, a user configuration is not needed for material installation, and an install configuration is not needed for install verification of an installation that is not used, or for verification of an end user identity that is not used. In this embodiment of the invention, user material is not modified by a standard installation, but redirection is still needed for virtualization.

The user material resource may use delivery media, for example: copy protected diskette redirection may be context sensitive. Some applications may share tasks, while some tasks need old resources to operate properly. Some embodiments of the invention may only redirect for specific applications.

Insert/eject, install, and uninstall of all removable media for applications without such processes embedded into original code requires converting a binary version of code, not recompiling source code to add such functionality. This allows multiple installations, redirection of several applications at same time, and combination of multiple redirections into one task. Some examples include: fault tolerance to catastrophic faults during operation of a virtual application, where a power failure while running an application in a virtualization environment causes the application to clean up after itself; or where the virtualization environment and all redirection material resources completely disappear during course of fault, e.g. they reside in a DRAM.

Accordingly, the invention should only be limited by the claims included below.

I claim:

1. A method for virtualizing material, comprising the steps of:

converting user material Mu from an external installation environment Mi for installation onto a storage medium in a revised user material state Mu' for use within a user environment that comprises a programmable machine without permanently altering said user material Mu;

saving information Md about differences between said user material Mu prior to such installation on said storage medium and said revised user material Mu';

using said revised user material Mu' installed on said storage medium with said programmable machine to manipulate data representing physical objects or activities; and converting said user environment to a pre-installation state with said saved information Md upon removal of said revised user material Mu' from said storage medium.

2. A method for installing an application program onto a storage medium for use in a programmable machine to manipulate data representing physical objects or activities, comprising the steps of:

saving said application program on said storage medium;

saving information about said application program on said storage medium to allow said storage medium to be converted from an installed state back to a pre-installed state upon termination of said application program;

optionally auto-launching said application program once the application program is installed onto said storage medium;

using said application program to perform an application specific task;

terminating said application program when any use thereof is completed;

optionally generating a place holder for said application program on said storage medium;

removing said application program from said storage medium when appropriate; and using said saved information about said application program as necessary to convert said storage medium from said installed state back to said pre-installed state;

wherein data representing application content of any applications that pre-exist said application program on said storage medium are not permanently altered by application program installation on said storage medium, and wherein said pre-existing applications revert to substantially identical pre-installation versions after removal of said application program from said storage medium.

3. The method of claim 2, further comprising the step of:

redirecting said application program from an installation environment to a user environment to allow operation on said programmable machine of any of multiple application programs, multiple installations, application program specific installations, user specific installations, and remapping, including remapping of material resources to other media and remapping of read-only media to read-write media.

4. The method of claim 2, further comprising the step of:

using said place holder both to accelerate subsequent installations of said application program and to preserve end user application program preferences.

5. The method of claim 2, further comprising the step of:

hiding information by storing such information on said storage medium such that said information is imperceptible to said user.

6. The method of claim 5, wherein said hidden information is any of a license agreement, a counter, and an identification code.

7. An apparatus for converting a uni-directional process to a bi-directional process, comprising:

an installation module Pi that converts user material Mu from an external installation environment Mi for installation onto a storage medium in a revised user material state Mu' for use within a user environment that comprises a programmable machine without permanently altering said user material Mu, to allow use of said revised user material Mu' installed on said storage medium with said programmable machine to manipulate data representing physical objects or activities; and a module Pd for saving information Md about differences between said user material Mu prior to such installation on said storage medium and said revised user material Mu', wherein said user environment is converted to a pre-installation state upon removal of said revised user material Mu' from said storage medium.

8. The apparatus of claim 7, said installation module Pi being operable for auto-launching an application program contained within said user material once the material is installed onto said storage medium within said user environment, for terminating said application program after use of said application program is completed and for removing said application program from said storage medium within said user environment; and Said module Pd for saving information being operable for generating a place holder for said application program on said storage medium within said user environment.

9. The apparatus of claim 8, further comprising:

means Pr for redirecting said material Mu' from said user environment to a redirection environment Mr to allow said programmable machine to run any of multiple application programs, multiple installations, application program specific installations, user specific installations, and remapping, including remapping of material resources to other media and remapping of read-only media to read-write media.

10. The apparatus of claim 8, wherein said place holder accelerates subsequent installations, while preserving end user application preferences.

11. The apparatus of claim 7, wherein said module Pd for saving information is operable for hiding information on said storage medium.

12. The apparatus of claim 11, wherein said hidden information is any of a license agreement, a counter, and an identification code.

13. A method for installing an application program onto a storage medium for use in a programmable machine to manipulate data representing physical objects or activities, comprising the steps of:

obtaining user configuration information as necessary to select a correct version of delta material for said application program;

saving resources modified by a standard install as separate material on said storage medium;

saving resources added by a standard install as separate material on said storage medium;

saving residual information material necessary to verify a standard install on said storage medium;

installing a redirector on said storage medium to cause said programmable machine to operate as though a standard install of said application program has occurred; and redirecting requests for any of application resources and verification of install.

14. The process of claim 13, further comprising the step of:

removing redirection material and said application program from said storage medium.

15. The process of claim 13, further comprising the steps of:

accepting an application program from an application program environment for installation onto said storage medium within said programmable machine;

commencing an auto-start virtual process;

looking for pre-existing redirection material on a programmable machine system level storage medium and, if such redirection material is found, then looking for an application specific place holder on said system level storage medium;

displaying a place holder saved on said system level storage medium from a previous session if said place holder is found; and then running said application;

displaying a default place holder for said application program if said place holder is not found; and then running said application program;

installing redirection material as appropriate if no redirection material is found on said system level storage medium;

displaying a place holder for said application program; and then running said application program.

16. The process of claim 15, further comprising the steps of:

running said application program for either of a specified time or until a global event is generated, at which time a check is made to determine if said application program has requested a resource;

if a resource is requested, determining if said resource belongs to said redirection material and, if so;

replacing said resource request with a redirection resource request; and then passing said redirection resource request onto a resource handler; and passing said redirection resource request onto said resource handler if a resource requested does not belong to said redirection material.

17. The process of claim 16, further comprising the steps of:

determining if a request to eject said application program has been issued, if said application program has not requested a resource; or if said request is passed on by said resource handler;

determining if said application program is to be terminated and, if so, terminating said application program.

18. The process of claim 17, further comprising the steps of:

determining if a request has been issued to terminate said application program if a request has not been issued to eject said application program; and if so, determining if said application program is to be ejected; and, if so, ejecting said application program; and entering a termination phase.

19. The process of claim 18, further comprising the steps of:

determining if a place-holder should be saved on said system level storage medium if said application program enters said termination phase; and, if so, saving said place-holder to said system level storage medium;

waiting for the application program to end;

saving user preferences to redirection material on said system level storage medium if appropriate; and then stopping said process; and removing said redirection material from said system level storage medium if a place-holder should not be saved on said permanent storage medium; and stopping said process.

20. The process of claim 19, further comprising the steps of:

waiting for said application program to end if a place holder is not to be saved to said system level storage medium;

determining if user application program preferences are to be saved when said operation of application program ends; and, if so saving said user preferences to redirection material on said system level storage medium; and stopping said process;

otherwise checking to see if other application program preferences are saved to redirection material; and, if so stopping said process;

otherwise removing said redirection material from said system level storage medium; and stopping said process.

21. The process of claim 16, further comprising the steps of:

modifying said redirection resource request to said resource handler in accordance with resource request content to combine transfer of resources or requests for resources between user material and redirection material.

* * * * *